March 14, 1950  H. P. KUPIEC  2,500,758
MULTIFLOW CONTROL VALVE
Filed Jan. 22, 1949  4 Sheets-Sheet 1

INVENTOR.
HARRY P. KUPIEC
BY Clark & Ott
ATTORNEYS

March 14, 1950 — H. P. KUPIEC — 2,500,758
MULTIFLOW CONTROL VALVE
Filed Jan. 22, 1949 — 4 Sheets-Sheet 2

INVENTOR.
HARRY P. KUPIEC
BY Clark & Ott
ATTORNEYS

March 14, 1950  H. P. KUPIEC  2,500,758
MULTIFLOW CONTROL VALVE
Filed Jan. 22, 1949  4 Sheets-Sheet 3

INVENTOR.
HARRY P. KUPIEC
BY
Clark & Ott
ATTORNEYS

March 14, 1950 H. P. KUPIEC 2,500,758
MULTIFLOW CONTROL VALVE
Filed Jan. 22, 1949 4 Sheets-Sheet 4

INVENTOR.
HARRY P. KUPIEC
BY
Clark&Ott
ATTORNEYS

Patented Mar. 14, 1950

2,500,758

UNITED STATES PATENT OFFICE 2,500,758

MULTIFLOW CONTROL VALVE

Harry P. Kupiec, Paramus, N. J., assignor to Air Associates, Incorporated, Teterboro, N. J., a corporation of New Jersey Application January 22, 1949, Serial No. 72,117

13 Claims. (Cl. 277—8)

This invention relates to a multi-flow valve for controlling the movement and positioning of operational parts of aircraft and the like, the present application being a continuation in part of the co-pending application, Serial No. 775,231, now abandoned.

The invention has in view a multi-flow control valve adapted to be arranged in a hydraulic system for manually controlling an operational part of aircraft and the like such as landing gear, arresting gear, wing flaps, speed brakes, wheel brakes, escape chute door cylinders and the like and for producing a non-pressurized system when the operational parts are in set position or not in use.

Another object of the invention is to provide a control valve which automatically reduces the pressure in the hydraulic system to zero when an operational part has completed the movement to set position or has completed the movement to operative position to thereby provide a normally non-pressurized system which minimizes rupture in the system and reduces the fire hazard since the hydraulic fluid employed readily atomizes and bursts into flame upon rupture in the system.

Still another object of the invention is to provide a control valve which is constructed to prevent premature reduction of the hydraulic pressure in the system to zero before the operational part has completed its movement to set position.

Still another object of the invention is to provide a multi-flow control valve which may be employed with a multiple number thereof in series in the system, with each valve adapted for independent operation for controlling an operational part without interfering with the use of the other control valves in the system or for preventing the independent use of any of the operational parts controlled thereby.

The invention further provides in a modified form thereof, a multi-flow control valve having a reciprocatory shuttle located within and forming a valve element within a manually actuated valve element and which shuttle is moved by the differential of pressure on the opposite ends thereof for automatically returning the system from a pressurized to a non-pressurized system.

With the foregoing and other objects in view, reference is now made to the following specification and accompanying drawings in which the preferred embodiments of the invention are illustrated.

Figure 7:
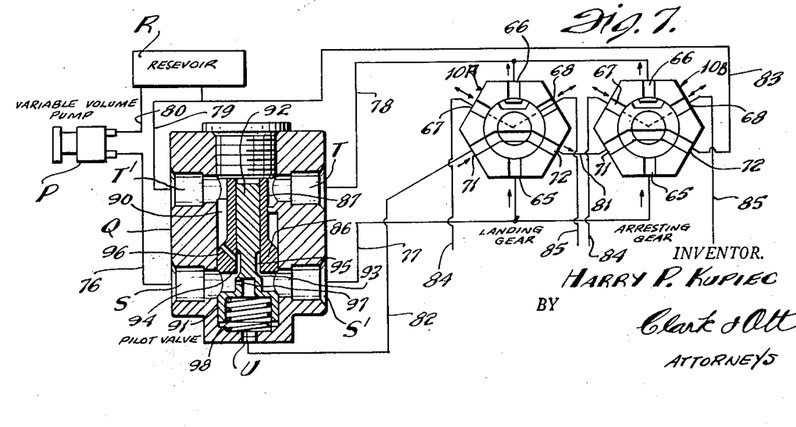
Fig. 7 is a schematic view of a pressure system showing two of the multi-flow control valves in the system with certain of the parts of the system shown in section.
Figure 8:
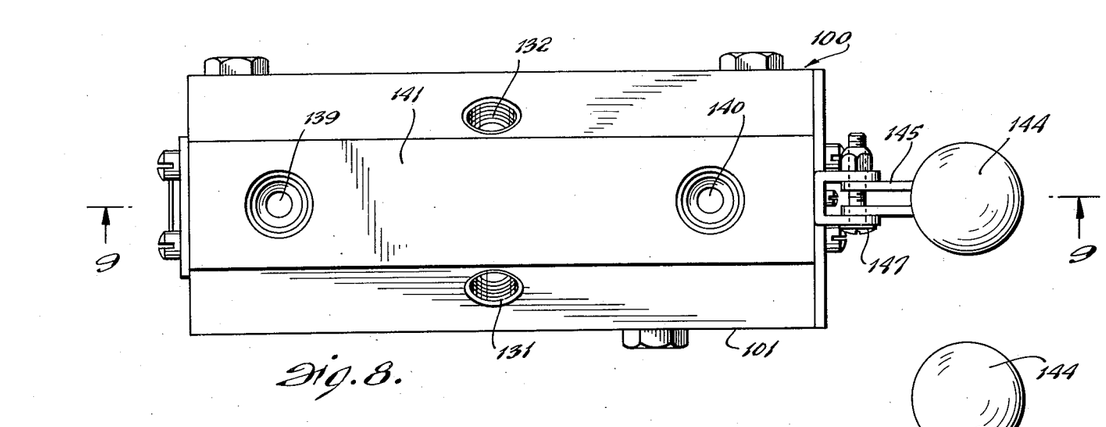
Fig. 8 is a top plan view of a multi-flow control valve embodying a modified form of the invention.

Referring to the drawings by characters of reference and more particularly to the form of the invention illustrated in Figs. 1 to 7 thereof, the multi-flow valve is adapted to be employed in a pressure system for controlling the movement of operational parts of aircraft and the like, and as illustrated in Fig. 7 of the drawings two such valves are connected in series in the system for operating landing gear, arresting gear and the like, it being understood that any number of such valves may be employed for independently operating and positioning of an operational part having a pressure responsive device in the system with the valves respectively.

The valve indicated generally by the reference character 10 consists of a valve body 11 of rectangular formation in plan having aligned longitudinally extending bores 12 and 13 opening through the opposite ends thereof which are closed at one end of the body by plates 14 and 15 and at the opposite end thereof by an apertured plate 16 in which slidably protrudes the outer ends of a plunger 17 and a shaft 18 respectively arranged in said bores for longitudinal reciprocatory movement therein.

The plunger 17 is pivotally connected at its outer end to one end of a link 19 having its opposite end pivotally connected to a control lever 20 provided with an enlarged rounded upper end 21. The shaft 18 is secured at its outer end in a bifurcated element 22 pivotally connected with the control lever between the furcations thereof. The plunger 17 is cut away or reduced in diameter at longitudinally spaced portions forming peripheral recesses 25, 26 and 27 between the wall of the bore 12 and the faces of the cut away portions and which provide outermost peripheral lands 28 and 29 and intermediate peripheral lands 30 and 31 on opposite ends of the peripheral recess 26. The said lands slidably fit the bore 12 while the outermost lands 28 and 29 are recessed to receive annular packing 32 to prevent outward flow of the fluid between the said lands and the wall of the recess. The plunger 17 is formed with a longitudinally extending bore 34 having radially arranged outlets 35 and 36 at the opposite ends thereof respectively. The outlets 35 open into the peripheral recess 25 adjacent the peripheral land 30 while the outlets 36 open into the peripheral recess 27 adjacent the peripheral land 31. The bore 34 extends part way through the plunger 17 and is closed at its inner end by a screw plug 37.

The shaft 18 is cut away or reduced in diameter at longitudinally spaced portions adjacent its inner end so as to form peripheral recesses 39, 40 and 41 between the wall of the bore 13 and the faces of the recessed portions and to provide peripheral lands 42 and 43 at the opposite ends of the peripheral recess 40. The shaft is also recessed to receive annular packing 44 on opposite sides of said peripheral recesses to prevent escape of the fluid between the same and the wall of the reduced inner end of the bore 13. The outer end of the bore 13 is enlarged in diameter as at 45 and the shaft is formed with an annular flange 46 which loosely fits the wall of the enlarged bore portion 45 and provides a head against which the pressure of the fluid is exerted so as to retain the shaft 18 stationary or in fixed position during the movement of the operational part to operative positions.

Arranged on the shaft 18 is a tubular member 47 having an apertured inner end 48 through which the shaft protrudes with the enlarged open end 49 of the tubular member secured in the bore 13 between a bearing sleeve 50 and an annular shoulder 51 formed in the bore. The bearing sleeve 50 protrudes through the plate 16 and slidably receives the shaft 18 which is normally tensioned against movement by a coiled expansion spring 52 arranged in surrounding relation with the shaft and engaged at its ends against a split tubular spring retainer 53 and a split flanged disk 54. The split tubular spring retainer 53 and the split flanged disk 54 form complete annuluses when the split portions thereof are in mating relation about the shaft. The flanged disk is tensioned by the spring 52 against the annular shoulder 55 formed by the enlarged end 49 of the tubular member 47 with the flange thereof slidably fitted in an annular recess 56 formed in said shaft. The tubular spring retainer 53 is formed with an outwardly extending peripheral flange 57 at its outer end which is tensioned by said spring against the recessed face 58 of said bearing sleeve 50, while the opposite end of said spring retainer is formed with an inwardly directed annular flange 59 which extends into and slidably fits the recess 56 in the shaft 18.

By this construction the flanged disk 54 is tensioned against the annular shoulder 60 formed by the annular recess 56 in the shaft 18, while the inwardly directed annular flange 59 of the spring retainer 53 is tensioned against the oppositely disposed annular shoulder 61 formed in the shaft 18 by said annular recess. The axial length of the annular space surrounding the shaft 18 between the confronting ends of the spring retainer 53 and the flanged disk 54 is the length of movement of the shaft 18 in either direction in the bore 13 which movement is approximately one-eighth of an inch. This movement is imparted to the shaft 18 by the control lever 20 which may be moved in either direction with reference to the tubular member 47 and in order to prevent premature reduction of the pressure of the fluid during the movement of the operational part to operative positions, the shaft is formed with an annular piston head 62 secured thereto and snugly and slidably fitting the annular inner wall of the tubular member 47. The said piston head is normally located substantially midway between spaced apertures 63 and 64 in the wall of the tubular member 47 which open at their inner ends into the tubular member on opposite sides of the piston head 62 and at their outer ends the said apertures open into the annular space between the tubular member 47 and the wall of the enlarged portion 45 of the bore 13. This provides a dashpot construction which forces the fluid pressure out through the opening 63 and in through the opening 64 when the shaft 18 is moved in one direction and vice versa when the shaft is moved in the opposite direction, and which functions to prevent premature movement of the shaft 18 to non-pressurize the system when the fluid pressure against the flange or head 46 is momentarily reduced due to sudden gusts of wind against the operational part.

The valve body 11 is formed with fluid pressure supply and return ports 65 and 66 which open into the peripheral recesses 25 and 26 respectively. The valve body is also provided with two service ports 67 and 68. The port 67 opens into a passageway 69 communicating with the bore 12 and is controlled for the passage of fluid therethrough by the land 31 which is normally arranged in partially covering releation therewith. The service port 68 communicates at its inner end with the enlarged portion 45 of the bore 13 between the enlarged end 49 of the tubular member 47 and the flange 46 of the shaft 18. At the juncture of the enlarged bore portion 45 of the bore 13 with the reduced portion thereof, the same is provided with a passageway 70 which opens into the bore 12 and is controlled for the flow of fluid therethrough by the land 30 which is normally disposed in partially covering relation therewith. The valve body also includes two fluid pressure ports 71 and 72 both of which open into the reduced portion of the bore 13.

Constructed in this manner the valve is of the multi-flow type in which the fluid pressure is adapted to be admitted to the valve through the pressure port 65 and by manipulation of the control lever 20 to flow out through either one of the service ports 67 and 68 to the pressure responsive device (not shown) which controls the operational part and which is exhausted through the other of said service ports 67 and 68 and thence discharged from the valve through the return port 66. The fluid pressure is also admitted to the valve through the pressure port 71 in order to effect the non-pressurizing of the system, the fluid being discharged through the other pressure port 72.

One or more of the valves 10 may be connected in a fluid pressure system for independently controlling operational parts of an aircraft or the like. As illustrated in Fig. 7 of the drawings two such valves indicated generally by the reference characters 10A and 10B are in series in the system for controlling the flow of fluid pressure to the pressure responsive devices for operating the landing gear and arresting gear respectively of an aircraft. In addition thereto, the fluid pressure system includes a variable pump P, a pilot relief valve Q and a reservoir R. The pilot valve Q includes inlet and outlet fluid pressure ports S and S' and inlet and outlet return ports T and T' and a pilot fluid port U. The high pressure side of the variable volume pump P is connected with the inlet fluid pressure port S by piping 76, the opposite fluid pressure port S' being connected by piping 77 with the fluid pressure port 65 of each of the valves 10. The fluid return port 66 of each of the valves 10 is connected by piping 78 with the return port T of the pilot valve, the opposite return port T' being connected by piping 79 with the inlet side of the reservoir R while the outlet side of the reservoir is connected by piping 80 with the low pressure side of the variable volume pump P.

The valves are connected in series through the fluid pressure ports 71 and 72 by piping 81 which connects the fluid pressure port 72 of the valve 10A with the fluid pressure port 71 of the valve 10B, the fluid pressure port 71 of the valve 10A being connected with the pilot fluid port U by piping 82 and the fluid pressure port 72 of the valve 10B being connected by piping 83 with the piping 79 leading to the reservoir. The service ports 67 and 68 of each of the valves are respectively connected by piping 84 and 85 to the opposite ends of the pressure responsive devices (not shown) which control the operation of the landing gear and arresting gear respectively as indicated in the drawings, it being understood that the piping 84 constitutes the fluid supply piping to each of the pressure responsive devices when the operational part is moved in one direction while the piping 85 constitutes the return line therefor and when the operational part is moved in the oppostie direction the piping 85 constitutes the fluid pressure line while the piping 84 constitutes the return line.

The pilot valve Q may be of any desired type but as illustrated the same includes a centrally arranged sleeve 86 formed with a reduced end 87 so as to provide an annular recess 90 between the same and the body of the valve in communication with the return ports T and T'. The pilot valve Q also includes a reciprocatory piston 91 fitted at one end in the body of the valve adjacent the pilot fluid port U and having a reduced inner end 92 slidably fitted in the sleeve 86. The said piston is formed with a chamfer 93 which is adapted to engage an annular seat 94 formed on the enlarged end of the sleeve 86 for closing off the flow of the fluid pressure from the fluid pressure port S to an annular recess 95 located between the sleeve 86 and the piston 91. The recess 95 is in communication with the annular recess 90 and the return ports T and T' by means of a duct 96 in the enlarged end of the sleeve 86.

The piston 91 is also provided with a duct 97 communicating with the fluid pressure port S and with the hollow interior of the enlarged end of said piston for permitting of the flow of the fluid from the fluid pressure port S through the pilot fluid port U and the piping 82 to the valves. The piston 91 is engaged by a coiled expansion spring 98 interposed between the enlarged end thereof and the adjacent end of the casing of the pilot valve Q which functions to move the piston 91 to position the chamfer 93 on its seat 94 when the flow of the fluid pressure through the ports 71 and 72 has been shut off so as to increase the pressure in the piping 82. The piston 91 is moved in the opposite direction by the fluid pressure from the fluid pressure port S so as to move the piston to open the passageway with the duct 96 when the fluid pressure in the piping 82 and in the enlarged end of the piston has been lowered by the opening up of the flow of the fluid pressure through the ports 71 and 72.

Figure 1:
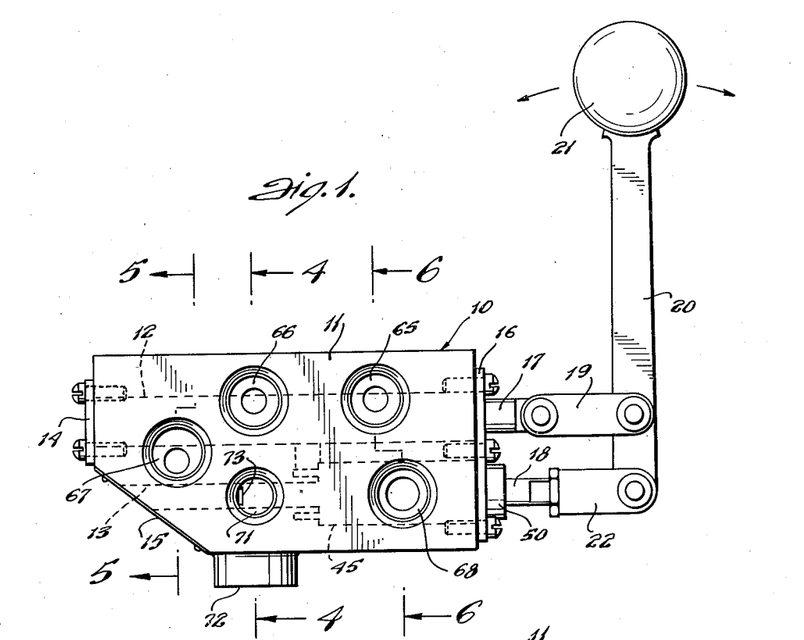
Fig. 1 is a view in side elevation of a multi-flow control valve constructed in accordance with the invention.
Figure 2:
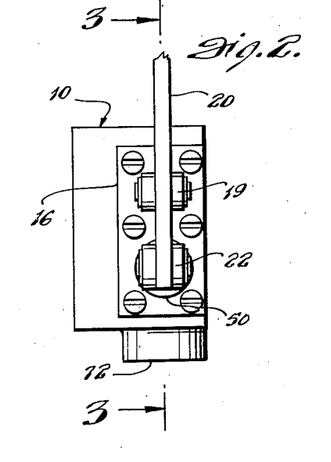
Fig. 2 is an end view thereof with the upper portion of the hand control lever broken away.

In use and operation the control lever 20 of the valve is always disposed in an angular position either to the right or to the left of the vertical position shown in Fig. 1 of the drawings. In connection with the operation of a landing gear, the same would be disposed in a lowered position when the control lever is swung in one direction and when the control lever is swung in the opposite direction the landing gear would be in raised position.

When the control lever 20 of any one of the valves is swung to the right of the view shown in Fig. 1 of the drawings, the plunger 17 is moved outwardly or to the right while the shaft 18 is moved inwardly or to the left. The movement of the plunger 17 to the right permits flow of the fluid pressure through the fluid port 65 into the recess 25 and thence through the outlets 35, bore 34, outlets 36, passageway 69 and through the service port 67 to the pressure responsive device (not shown) which controls the operational part. The fluid pressure is exhausted from said pressure responsive device through the service port 68 into the enlarged portion 45 of the bore 13 and thence through the passageway 70 and into the annular recess 26 from which it is discharged through the return port 66. The inward movement of the shaft 18 positions the land 42 in covering relation with the narrow opening 73 at the inner end of the fluid pressure port 71 to thereby shut off the flow of the fluid pressure from the fluid port U of the relief valve Q. The shutting off of the flow of the fluid pressure through the pressure ports 71 and 72 changes the system from a non-pressurized system to a pressurized system which remains pressurized during the period that the operational part is being moved to set position. The inward movement of the shaft 18 effects inward movement of the spring retainer 53 therewith until the flanged inner end 59 thereof is compressed by the spring 52 against the outer end of the flanged disk 54 which forms a stop to limit the inward movement of the shaft. This inward movement of the shaft forces the fluid pressure from within the tubular member 47 through the aperture 63 and into the enlarged portion 45 of the bore 13 while fluid pressure from the service port 68 flows through the enlarged portion 45 of the bore 13 thence through the aperture 64 and into the tubular member 47 on the opposite side of the flange 62 and is then discharged through the discharge port 66.

Figure 3:
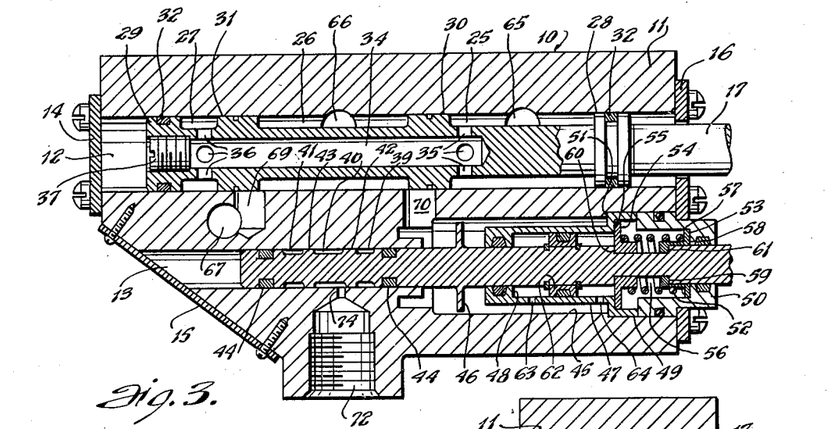
Fig. 3 is an enlarged longitudinal sectional view taken approximately on line 3—3 of Fig. 2.
Figure 4:
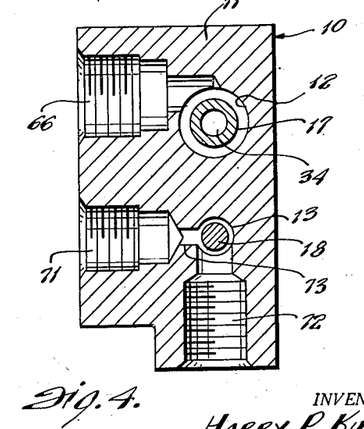
Fig. 4 is an enlarged transverse sectional view taken approximately on line 4—4 of Fig. 1.
Figure 5:
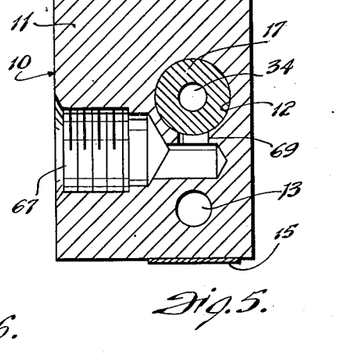
Fig. 5 is an enlarged transverse sectional view taken approximately on line 5—5 of Fig. 1.
Figure 6:
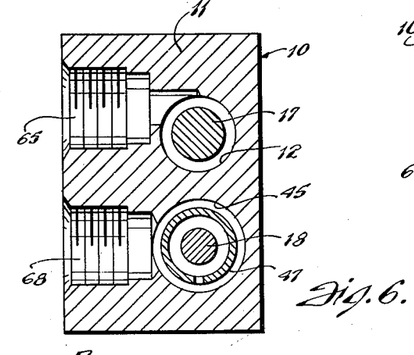
Fig. 6 is a similar view taken approximately on line 6—6 of Fig. 1.

The flow of fluid pressure from the pressure responsive device (not shown) through the service port 68 produces a pressure head against the outer face of the annular flange 46 of the shaft 18. This pressure head retains the shaft 18 in stationary or fixed position during the movement of the operational part to set or operative positions and prevents premature reduction of the hydraulic pressure in the system to non-pressurized condition. Thus resistance to the movement of an operational part such as wing flaps by sudden gusts of wind is not transmitted to the hand lever 20. The pressure head against the flange 46 retains the shaft 18 in inward position with the spring 52 compressed. The pressure head diminishes when the flow of the fluid pressure from the pressure responsive device (not shown) has passed by the flange 46 through the annular space between the flange and the inner periphery of the reduced portion 45 of the bore 13. When this takes place, the operational part has been moved to set position whereupon the spring 52 functions to move the shaft 18 to its outermost position as shown in Fig. 3 of the drawings whereby the land 42 is moved from covering relation with the reduced inner end 73 of the pressure port 71 to thereby open up the fluid line to the fluid pressure supply through the fluid pressure port U to thereby reduce the pressure against the enlarged end of the piston 91 whereupon the piston is moved to open the duct 96 and bypass the fluid to the reservoir which effects a non-pressurizing of the system.

When the control lever 20 of any one of the valves is swung to the left of the view shown in Fig. 1 of the drawings, the plunger 17 is moved inwardly or to the left while the shaft 18 is moved outwardly or to the right. The movement of the plunger 17 to the left permits flow of the fluid pressure through the port 65 into the recess 25 and thence through the service port 70 to the pressure responsive device (not shown) which controls the operational part. The fluid pressure is exhausted from the operational part through the service port 67 and is discharged through the return port 66. The fluid pressure from the service port 70 passes through the enlarged portion 45 of the bore 13 and produces a pressure head against the inner face of the flange 46 so as to maintain the shaft 18 in outward position until the operational part has been moved to set or operative position whereupon the shaft 18 will be moved inwardly by the spring 52 to open the passageway between the fluid pressure ports 71 and 72 so as to non-pressurize the system.

The pump P is of the variable volume type which functions to increase the flow of the fluid and the pressure thereof when any one of the valves 10 in the system is operated to effect movement of an operational part. In hydraulic fluid systems for operation of a landing gear, the fluid pressure is approximately 3,000 pounds per square inch. This pressure is maintained in the system so long as the landing gear is being moved. When however, the piston 91 is moved to permit flow of the fluid through the annular recess 95 for return to the reservoir, the system becomes non-pressurized. The pressure however, is sufficient to effect a continual flow of the fluid through the fluid pressure ports 71 and 72 of the valves in the system and through the return line 83 to the reservoir. Thus the valves 10 and the system are non-pressurized when the operational part is in set or operative position or is not being moved to thereby reduce the wear and tear on the valves and the likelihood of rupture of the system with the consequent ignition of the fluid.

It will be understood that sudden gusts of wind may strike the operational part during movement thereof to operative position and such wind pressure against the operational part may reduce the pressure and the flow of fluid against the flange or head 46 of the shaft. When this takes place the spring 52 functions to retain the shaft in position so as to prevent premature movement thereof to non-pressurize the system.

In the form of the invention illustrated in Figs. 8 to 11 inclusive of the drawings, the multi-flow valve indicated generally by the reference character 100 consists of a valve body 101 of rectangular formation in plan having a longitudinally extending bore 102 opening through the opposite ends thereof. The bore 102 is closed by a plug 103 at one end thereof and by an apertured plug 104 at the opposite end in which is slidably arranged a rod 105 pivotally connected at its outer end to the lower end of a control lever 106. The rod 105 is formed with an enlarged inner end 107 secured in one end of a tubular valve element 108 for imparting reciprocatory movement to said valve element longitudinally of the bore 102 by manipulation of the control lever 106.

The valve element 108 is cut away or reduced in diameter at longitudinally spaced portions forming peripheral recesses 109 and 110 and providing peripheral lands 111 and 112 at the opposite ends of said valve element and an intermediate peripheral land 113 between said recesses, which lands slidably fit the bore 102. The valve element 108 is closed at one end by said enlarged inner end 107 of the rod 105 and by a plug 114 at the opposite end. Located within the valve element 108 is a reciprocatory shuttle 115 having a cylindrical central portion 116 and longitudinally projecting reduced end portions 117. The central portion 116 slidably fits the inner periphery of the valve element 108 while the reduced end portions 117 are normally spaced from the enlarged inner end 107 of the rod 105 and the plug 116 to permit of longitudinal reciprocatory movement of said shuttle within the valve element. The reduced ends 117 also provide chambers 118 between the same and the inner periphery of the valve element 108 and surrounding the reduced ends 117 are matched coiled contractile springs 119 which are tensioned at their inner ends against the central portion 116 of the shuttle and at their outer ends against the enlarged inner end 107 of the rod 105 and the plug 114, the said springs functioning to normally maintain the shuttle medially between the opposite ends of said valve element. The enlarged inner end 107 of the rod 105 and the plug 114 are formed with ducts 120 and 121 respectively opening through the opposite ends thereof for establishing communication between the chambers 118 and the bore 102 beyond the ends of the valve element.

The valve body 101 is formed with a fluid pressure port 123 which opens through a side wall thereof and communicates at its inner end with a passageway 124 extending longitudinally of the bore 102 and opening through branch openings 125 and 126 into the peripheral recesses 109 and 110 respectively. A fluid return port 127 opens through the opposite side wall of the valve body and communicates at its inner end with a passageway 128 extending longitudinally of the bore 102 and located on the opposite side thereof from the passageway 124. The return port 127 is located medially of branch openings 129 and 130 which extend laterally from said passageway 128 and open into the bore 102 adjacent the plugs 103 and 104 respectively.

The valve body 101 also includes two fluid pressure ports 131 and 132 which open through the top thereof and extend inwardly radially of the valve element 108. The said fluid pressure ports are each provided with two reduced branch openings 133 and 134 which normally align at their inner ends with radially arranged apertures 135 and 136 in the wall of the valve element 108 in equally spaced relation on opposite sides of the longitudinal center of the land 113 thereof. The apertures 135 and 136 normally register at their inner ends with peripheral grooves 137 and 138 formed in the periphery of the central portion 116 of the shuttle 115 in equally spaced relation on opposite sides of the longitudinal center thereof.

A pair of longitudinally spaced service ports 139 and 140 open through the upper horizontal face 141 of the valve body with their reduced inner ends 142 and 143 opening into the bore 102 so that the flow therethrough is controlled by the lands 111 and 112 of the valve element 108.

The control lever 106 projects above the valve body 101 and is provided with an enlarged knob 144 for facilitating manipulation thereof. Links 145 are pivotally connected by pivot pins 146 and 147 to the control lever 106 and to a bracket 148 affixed to the end of the valve body so that the pivot pin 146 provides a fulcrum about which the lever is rocked.

The plugs 103 and 104 are provided with recesses 149 and 150 at their inner ends respectively which permit of the flow of fluid pressure against the ends of the valve element 108 when the valve element is disposed against said plugs. The ends of the valve element 108 are beveled, as at 151 so as to provide a vent through the service ports 139 and 140 to eliminate any possibility of a hydraulic lock occurring in piping connected therewith. Constructed in this manner, the valve is of the multi-flow type in which the fluid is adapted to be admitted to the valve through the pressure port 123 and by manipulation of the control lever 106 to flow out through either one of the service ports 139 and 140 to the pressure responsive device (not shown) which controls the operational part and which is exhausted through the other of said service ports 139 and 140 and thence discharged from the valve through the return port 127. The fluid is also admitted to the valve through the pressure port 131 in order to effect the non-pressurizing of the system irrespective of the position of the valve element 108, the fluid being discharged through the pressure port 132.

In use and operation one or more of the valves 100 may be connected in the fluid system indicated in Fig. 7 of the drawings in a manner similar to the valves 10A and 10B. In connection with the operation of a landing gear, the same would be disposed in lowered position when the control lever 106 thereof is swung to an angular position on one side and when swung to an angular position in the opposite direction the landing gear would be moved to an elevated position. When the control lever 106 is swung to the right the movement thereof will shift the valve element 108 to the left against the plug 103 thus opening the service port 139 to the peripheral recess 109 to thereby admit fluid pressure from the fluid pressure port 123 to pass through the service port 139 and thence to the pressure responsive device (not shown) for actuation of the operational part. The aforesaid movement of the valve element 108 also opens the service port 140 to the return port 127 for discharge of the fluid pressure from the pressure responsive device.

Figure 9:
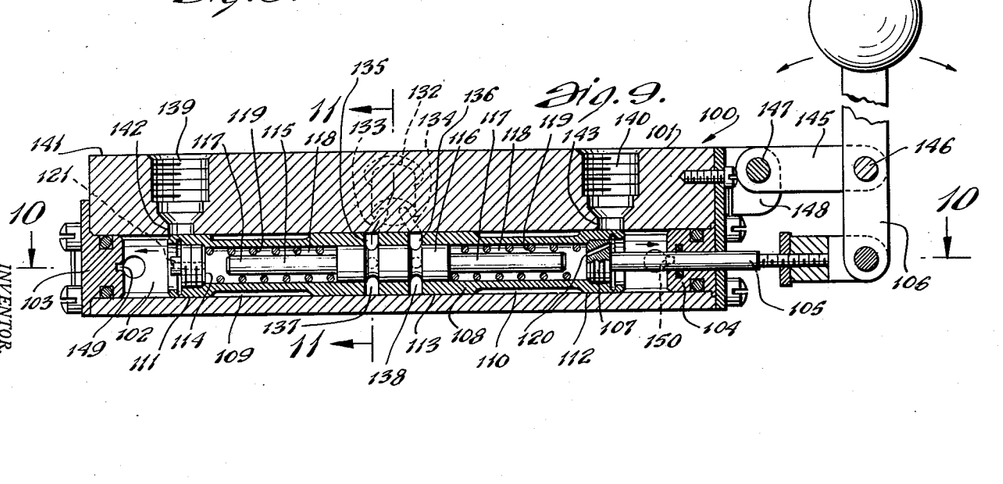
Fig. 9 is a longitudinal vertical sectional view taken approximately on line 9—9 of Fig. 8.
Figure 10:
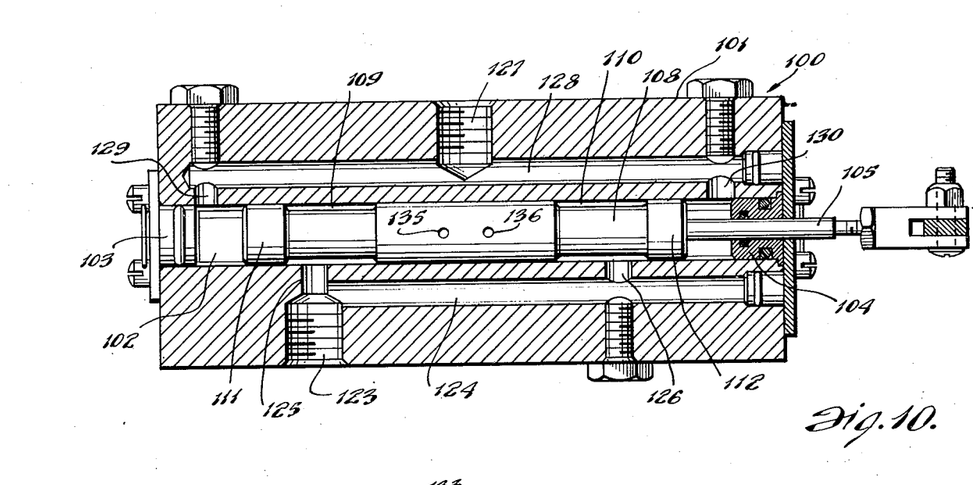
Fig. 10 is a longitudinal horizontal sectional view taken approximately on line 10—10 of Fig. 9.
Figure 11:
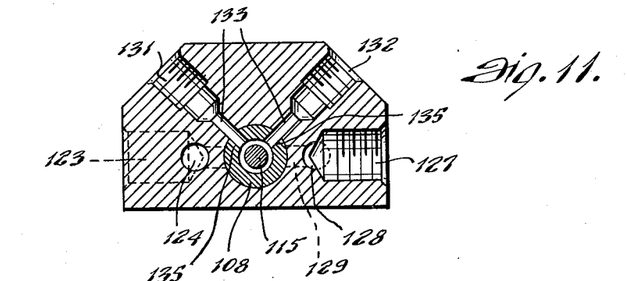
Fig. 11 is a transverse vertical sectional view taken approximately on line 11—11 of Fig. 9.

The aforesaid movement of the valve element 108 also effects movement of the shuttle or valve element 115 therewith, that is towards the left of the view shown in Fig. 9 whereby the fluid pressure ports 131 and 132 are closed. When the valve is installed in the fluid pressure system shown in Fig. 7, the aforesaid movement of the shuttle or valve element 115 would build up the pressure in the pipe line 82 leading from the high pressure port 139 and connected with the relief valve Q at the large end of the piston 92 which is then moved to engage the annular seat 94 to close off the flow of the fluid pressure from the fluid pressure port S through the annular recess 95 and duct 96 to the reservoir R. The fluid pressure from the pump P is then directed through the fluid pressure ports S and S' of the relief valve Q and through the piping to the pressure port 123 and thence through the valve 106 to the pressure responsive device for actuation of the operational part.

The fluid return from the pressure responsive device, through the service port 140 establishes a differential of pressure on the opposite ends of the shuttle or valve element 115 admitted through the ducts 120 and 121 to thereby move the shuttle to the left and to compress the left-hand spring 119 so as to maintain the fluid pressure ports 131 and 132 in closed relation so long as the fluid pressure is being exhausted from the pressure responsive device through the service port 140. When the fluid pressure is completely exhausted from the pressure responsive device, the pressure will be equalized at the opposite ends of the valve element 108 and on the opposite ends of the shuttle 115 within the valve element whereby the shuttle will be moved to the right so that the peripheral recess 138 will register with the aperture 136 in the valve element and with the branch opening 133 of each of the pressure ports 131 and 132 to thereby open up said ports to permit the flow of fluid pressure through the valve. This results in the movement of the piston 92 so as to permit of flow of the fluid pressure through the annular recess 79 and by-pass the same to the reservoir. The pressure is maintained in the system so long as the landing gear is being raised. When however, the annular passageway 97 of the relief valve Q is open for the passage of the fluid pressure to the reservoir, the system becomes non-pressurized.

What is claimed is:

1. In a multi-flow control valve, a valve body having fluid inlet and outlet ports, two service ports and two auxiliary ports, two valve elements mounted for reciprocatory movement in said valve body to control the flow of fluid through said auxiliary ports and to control the flow of fluid from the inlet port through one of said service ports and the return flow through the other service port and the discharge thereof through the outlet port, and one of said valve elements having a head against which the pressure of the fluid flowing through the valve is exerted for retaining said valve element in position to prevent the flow of fluid through said auxiliary ports during the time that the fluid is flowing through the service ports.

2. In a multi-flow control valve, a valve body having fluid inlet and outlet ports, two service ports and two auxiliary ports, two valve elements extending into said valve body, a lever pivoted to the outer ends of said valve elements for simultaneously moving said valve elements by the swinging movement of said valve lever to control the flow of fluid through said auxiliary ports and to control the flow of fluid from the inlet port through one of said service ports and the return flow through the other service port and the discharge thereof through the outlet port, and one of said valve elements having a head against which the pressure of the fluid flowing through the valve is exerted for retaining said valve element in position to prevent the flow of fluid through said auxiliary ports during the time that the fluid is flowing through the service ports.

3. In a multi-flow control valve, a valve body having fluid inlet and outlet ports, two service ports and two auxiliary ports, two valve elements extending into said valve body and mounted for reciprocatory movement to control the flow of fluid through said auxiliary ports and from the inlet port through one of said service ports and the return flow through the other service port and the discharge thereof through the outlet port, means tensioning one of said valve elements for normally moving the same into position to permit the flow of fluid through said auxiliary ports, and said last mentioned valve element having a head against which the pressure of the fluid flowing through the valve is exerted for retaining said valve element in position to prevent the flow of fluid through said auxiliary ports during the time that the fluid is flowing through the service ports.

4. In a multi-flow control valve, a valve body having parallel longitudinally extending main and auxiliary cavities, fluid inlet and outlet ports opening into said main cavity, two service ports opening into said cavities respectively, a passageway between said cavities and two auxiliary ports opening into said auxiliary cavity, a valve element mounted for reciprocatory movement in said main cavity for controlling the flow of fluid from said inlet port through said service ports and the discharge thereof through said outlet port, a valve element mounted for reciprocatory movement in said auxiliary cavity for controlling the flow of fluid through said auxiliary ports, and said last mentioned valve element having a head against which the pressure of the fluid flowing through one of said service ports is exerted for retaining said last mentioned valve element in position to prevent the flow of fluid through said auxiliary ports during the time that the fluid is flowing through the service ports.

5. In a multi-flow control valve, a valve body having parallel longitudinally extending main and auxiliary cavities, fluid inlet and outlet ports opening into said main cavity, two service ports opening into said cavities respectively, a passageway between said cavities and two auxiliary ports opening into said auxiliary cavity, a valve element mounted for reciprocatory movement in said main cavity for controlling the flow of fluid from said inlet port through said service ports and the discharge thereof through said outlet port, a valve element mounted for reciprocatory movement in said auxiliary cavity for controlling the flow of fluid through said auxiliary ports, means tensioning said last mentioned valve element for normally moving the same into position to permit the flow of fluid through said auxiliary ports, and said last mentioned valve element having a head against which the pressure of the fluid flowing through said valve is exerted in opposition to the tension of said means for retaining said last mentioned valve element in position to prevent the flow of fluid through said auxiliary ports during the time that the first mentioned valve element is in position to permit the flow of fluid through said service ports.

6. In a multi-flow control valve, a valve body having fluid inlet and outlet ports, two service ports and two auxiliary ports, two valve elements extending into said valve body and mounted for reciprocatory movement to control the flow of fluid through said auxiliary ports and from the inlet port through one of said service ports and the return flow through the other service port and the discharge thereof through the outlet port, means tensioning one of said valve elements for normally moving the same into position to permit the flow of fluid through said auxiliary ports, said last mentioned valve element having a head against which the pressure of the fluid flowing through the valve is exerted for retaining said valve element in position to prevent the flow of fluid through said auxiliary ports during the time that the fluid is flowing through the service ports, and said tensioning means functioning to move said last mentioned valve element into position to permit the flow of fluid through said auxiliary ports when the flow of fluid through the service ports has ceased.

7. In a multi-flow control valve, a valve body having fluid inlet and outlet ports, two service ports and two auxiliary ports, two valve elements mounted for reciprocatory movement in said valve body, a lever pivoted to said valve elements for simultaneously moving one of said valve elements in one direction and the other of said valve elements in the opposite direction to control the flow of fluid through said auxiliary ports and to control the flow of fluid from the inlet port through one of said service ports and the return flow through the other service port and the discharge thereof through the outlet port, means tensioning one of said valve elements for normally moving the same into position to permit the flow of fluid through said auxiliary ports, said last mentioned valve element having a head against which the pressure of the fluid flowing through the valve is exerted for retaining said last mentioned valve element in position to prevent the flow of fluid through said auxiliary ports during the time that the fluid is flowing through the service ports, and said tensioning means functioning to move said last mentioned valve element into position to permit of the flow of fluid through said auxiliary ports when the flow of fluid through the service ports has ceased.

8. In a multi-flow control valve, a valve body having fluid inlet and outlet ports, two service ports and two auxiliary ports, two valve elements mounted for reciprocatory movement in said body for controlling the flow of fluid through said auxiliary ports and from the inlet port through one of said service ports and the return flow through the other service port and the discharge thereof through the outlet port, one of said valve elements having a head against which the pressure of the fluid flowing through the valve is exerted for retaining said valve element in position to prevent the flow of fluid through said auxiliary ports during the time that the fluid is flowing through the service ports, and means tensioning said last mentioned valve element for moving the same into position to permit of the flow of fluid through the auxiliary ports when the pressure of the fluid is relieved from the head of said last mentioned valve element.

9. In a multi-flow control valve, a valve body having a longitudinally extending cavity, a fluid inlet port opening into said cavity intermediate the ends thereof, a fluid return port having branches opening into said cavity adjacent the ends thereof and a pair of service ports opening into said cavity in longitudinally spaced relation, a hollow valve element located in said cavity for longitudinal reciprocatory movement, a control lever connected with said valve element for moving the same to a position to permit of the flow of the fluid from said fluid inlet port through one of said service ports and the return flow of fluid through the other service port and the discharge thereof through the fluid return port and for moving said valve element to an opposite position to permit of the flow of the fluid from said fluid inlet port through the last mentioned service port and the return flow of fluid through said first mentioned service port and the discharge thereof through the return fluid port, a shuttle located in the hollow interior of said valve element for longitudinal reciprocatory movement therein, said valve body having inlet and outlet auxiliary fluid ports each having branches opening into said cavity in longitudinally spaced relation, said valve element having longitudinally spaced apertures opening through the wall thereof adapted to register with said branch openings and said shuttle having grooves in the periphery thereof spaced apart a distance corresponding to the spacing of the openings in said valve element for permitting of the flow of fluid through said auxiliary inlet port and the discharge thereof through said auxiliary outlet port when the pressure on the opposite ends of the shuttle is equalized, said valve element having openings for admitting the pressure of the fluid to the opposite ends of said shuttle for moving the shuttle by the differential of pressure on the opposite ends thereof to dispose said grooves out of registry with the apertures in said valve element to thereby shut off the flow of fluid through said auxiliary ports.

10. In a multi-flow control valve, a valve body having an interior cavity and fluid inlet and outlet ports opening into said cavity and a pair of service ports opening into said cavity in spaced apart relation, a hollow valve element located in said cavity for reciprocatory movement, a control lever connected with said valve element for moving the same to a position to permit of the flow of the fluid from said inlet port through one of said service ports and the return flow of fluid through the other service port and the discharge thereof through the fluid outlet port and for moving said valve element to an opposite position to permit of the flow of the fluid from said fluid inlet port through the last mentioned service port and the return flow of fluid through said first mentioned service port and the discharge thereof through the outlet fluid port, a shuttle located in the hollow interior of said valve element for reciprocatory movement therein, said valve body having inlet and outlet auxiliary fluid ports each having branches opening into said cavity in spaced apart relation, said valve element having apertures opening through the wall thereof in spaced apart relation corresponding to the spacing of said branch openings and said shuttle having grooves in the periphery thereof spaced apart a distance corresponding to the spacing of the openings in said valve element for permitting of the flow of fluid through said auxiliary inlet port and the discharge thereof through said auxiliary outlet port when the pressure on the opposite ends of the shuttle is equalized, said valve element having openings for admitting the pressure of the fluid to the opposite ends of said shuttle for moving the shuttle by the differential of pressure on the opposite ends thereof to dispose said grooves out of registry with the apertures in said valve element to thereby shut off the flow of fluid through said auxiliary ports.

11. In a multi-flow control valve, a valve body having an interior cavity and fluid inlet and outlet ports opening into said cavity and a pair of service ports opening into said cavity in spaced apart relation, a hollow valve element located in said cavity for reciprocatory movement and having recesses for the passage of fluid, a control lever connected with said valve element for moving the same to positions permitting of the flow of fluid from said inlet port through said recesses and through said service ports and the discharge of fluid through the outlet port, a shuttle located in the hollow interior of said valve element for reciprocatory movement therein, means tensioning said shuttle in said valve element to move the shuttle therewith, said valve body having inlet and outlet auxiliary ports each having branches opening into said cavity in spaced relation, said valve element and shuttle having passageways spaced apart a distance corresponding to the spacing of said branch openings and adapted to register therewith, said valve element being open for admitting the pressure of the fluid to the opposite ends of said shuttle for moving the shuttle against said tension means by the differential of pressure against the opposite ends of said shuttle to dispose the passageways of said shuttle and valve element out of registry to thereby shut off the flow of fluid through said auxiliary ports, and the means tensioning said shuttle functioning to return the shuttle to dispose the passageway thereof in registry with the passageway of the valve element to permit of the flow of fluid through said auxiliary ports when the pressure on the opposite ends of the shuttle is equalized.

12. In a multi-flow control valve, a valve body having an interior cavity and fluid inlet and outlet ports opening into said cavity, a hollow valve element located in said cavity for reciprocatory movement, a control lever for moving said valve element to opposite positions, a shuttle located in the hollow interior of said valve element for reciprocatory movement therein, said valve body having inlet and outlet auxiliary ports, said valve element and shuttle having passageways adapted to register with the auxiliary ports for permitting of the flow of fluid therethrough, and said valve element being open for admitting the pressure of the fluid to the opposite ends of said shuttle for moving the shuttle by the differential of pressure against the opposite ends thereof to dispose the passageways of the shuttle and valve element out of registry to thereby shut off the flow of fluid through said auxiliary ports.

13. In a multi-flow control valve, a valve body having an interior cavity and fluid inlet and outlet ports opening into said cavity, a hollow valve element located in said cavity for reciprocatory movement, a control lever for moving said valve element to opposite positions to permit of the flow of fluid through the valve, a shuttle located in the hollow interior of said valve element for reciprocatory movement therein, means tensioning said shuttle to move the same with said valve element, said valve body having inlet and outlet auxiliary ports, said valve element and shuttle having passageways adapted to register with the auxiliary ports for permitting of the flow of fluid therethrough, and said valve element being open for admitting the pressure of the fluid to the opposite ends of said shuttle for moving the shuttle against said tension means by differential of pressure against the opposite ends of said shuttle to dispose the passageways of the shuttle and valve element out of registry to thereby shut off the flow of fluid through said auxiliary ports.

HARRY P. KUPIEC.

REFERENCES CITED

The following references are of record in the file of this patent:

UNITED STATES PATENTS

| Number | Name | Date |
|---|---|---|
| 2,358,950 | Trautman | Sept. 26, 1944 |
| 2,464,283 | Adams | Mar. 15, 1949 |